United States Patent
Dias

(10) Patent No.: US 10,345,806 B2
(45) Date of Patent: Jul. 9, 2019

(54) AUTONOMOUS DRIVING SYSTEM AND METHOD FOR SAME

(71) Applicant: Jaguar Land Rover Limited, Coventry (GB)

(72) Inventor: Eduardo Dias, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 121 days.

(21) Appl. No.: 15/119,021

(22) PCT Filed: Feb. 17, 2015

(86) PCT No.: PCT/EP2015/053280
§ 371 (c)(1),
(2) Date: Aug. 15, 2016

(87) PCT Pub. No.: WO2015/124552
PCT Pub. Date: Aug. 27, 2015

(65) Prior Publication Data
US 2016/0357186 A1 Dec. 8, 2016

(30) Foreign Application Priority Data
Feb. 18, 2014 (GB) .................................. 1402875.7

(51) Int. Cl.
*G05D 1/00* (2006.01)
*B60W 50/10* (2012.01)
(Continued)

(52) U.S. Cl.
CPC ......... *G05D 1/0061* (2013.01); *B60W 50/082* (2013.01); *B60W 50/10* (2013.01);
(Continued)

(58) Field of Classification Search
None
See application file for complete search history.

(56) References Cited

U.S. PATENT DOCUMENTS 8,260,482 B1    9/2012  Szybalski et al.
8,615,108 B1 *  12/2013 Stoppa ................. G06K 9/4671
                                                  382/103
(Continued)

FOREIGN PATENT DOCUMENTS

DE    10 2007 052 258 A1   6/2008
DE    10 2011 122 566 A1   6/2013
(Continued)

OTHER PUBLICATIONS

Search Report, GB Application No. 1402875.7, dated Mar. 5, 2015, 5 pages.
(Continued)

*Primary Examiner* — David P. Merlino
(74) *Attorney, Agent, or Firm* — Myers Bigel, P.A.

(57) ABSTRACT

The invention relates to an activation system for a vehicle comprising a steering wheel (20) and a semi-autonomous or an autonomous control system. The activation system comprises at least one imaging means (12), such as a camera, having a field of view encompassing at least a substantial portion of the steering wheel arranged to collect, in use, a first image data set representing a raw image of a subject within said field of view. A control module is also provided for processing said first image data and for making a determination as to whether a driver currently has both of their hands on the steering wheel or not. In response to making said determination, the activation system is configured and/or arranged to trigger a semi-autonomous or an autonomous control system.

15 Claims, 7 Drawing Sheets

(51) Int. Cl.
  *G06K 9/00* (2006.01)
  *B60W 50/08* (2012.01)
  *G06K 9/62* (2006.01)
  *B60W 50/00* (2006.01)

(52) U.S. Cl.
  CPC ..... *G06K 9/00355* (2013.01); *G06K 9/00375* (2013.01); *G06K 9/00832* (2013.01); *G06K 9/6202* (2013.01); *B60W 2050/0074* (2013.01); *B60W 2050/0095* (2013.01); *G05D 2201/0213* (2013.01)

(56) References Cited

U.S. PATENT DOCUMENTS

| | | | |
|---|---|---|---|
| 2004/0036764 A1 | 2/2004 | Hirota | |
| 2005/0063564 A1 | 3/2005 | Yamamoto et al. | |
| 2005/0238202 A1* | 10/2005 | Sato | G06K 9/00355 382/104 |
| 2009/0103815 A1 | 4/2009 | Inada et al. | |
| 2009/0287361 A1 | 11/2009 | Iwashima et al. | |
| 2011/0082628 A1 | 4/2011 | Murnane | |
| 2011/0160933 A1 | 6/2011 | Suzaki et al. | |
| 2011/0187862 A1* | 8/2011 | Ishikawa | H04N 7/18 348/148 |
| 2011/0243383 A1* | 10/2011 | Oyaizu | G06T 7/248 382/103 |
| 2012/0087543 A1* | 4/2012 | Choi | G06K 9/00382 382/103 |
| 2013/0079991 A1 | 3/2013 | Schmidt | |
| 2013/0261871 A1* | 10/2013 | Hobbs | B60K 37/06 701/28 |
| 2014/0148988 A1* | 5/2014 | Lathrop | B60W 50/10 701/23 |
| 2015/0003682 A1* | 1/2015 | Kondou | G06K 9/00389 382/103 |
| 2015/0283998 A1* | 10/2015 | Lind | B60W 30/00 701/23 |
| 2016/0303972 A1* | 10/2016 | Kuhne | B60W 30/12 |

FOREIGN PATENT DOCUMENTS

| | | |
|---|---|---|
| DE | 10 2012 101 686 A1 | 9/2013 |
| EP | 2 314 489 A1 | 4/2011 |
| GB | 2494241 A | 3/2013 |
| GB | 2494414 A | 3/2013 |
| JP | 2012-201301 A | 10/2012 |
| WO | WO 2013/118608 A1 | 8/2013 |
| WO | WO 2014/126999 A1 | 8/2014 |

OTHER PUBLICATIONS

Search Report, GB Application No. 1402875.7, dated Sep. 1, 2014, 6 pages.
International Search Report and Written Opinion, PCT/EP2015/053280, dated May 15, 2015, 15 pages.
First Office Action and English language translation, CN Patent Application No. 201580009319.3, dated Feb. 8, 2018, 19 pp.

* cited by examiner

AUTONOMOUS DRIVING SYSTEM AND METHOD FOR SAME

RELATED APPLICATIONS

This application is a 35 U.S.C. § 371 national stage application of PCT Application No. PCT/EP2015/053280, filed on Feb. 17, 2015, which claims priority from Great Britain Patent Application No. 1402875.7 filed on Feb. 18, 2014, the contents of which are incorporated herein by reference in their entireties. The above-referenced PCT International Application was published in the English language as International Publication No. WO 2015/124552 A1 on Aug. 27, 2015.

TECHNICAL FIELD

The present disclosure relates to an autonomous driving system and method. Embodiments relate to an activation system suitable for semi-autonomous and autonomous control systems for motor vehicles and particularly, but not exclusively, to a semi-autonomous and autonomous control system that is automatically triggered by the activation system. Embodiments of the present invention also relate to a method of determining that a driver of a vehicle has removed his hands from the steering wheel of the vehicle, and more specifically, but not exclusively, to a recognition algorithm that takes a series of decisions to determine, that a driver has removed his hands from the steering wheel such that in response thereto a cruise-control or other semi-autonomous driving system can be activated without further input from the driver.

Aspects of the invention relate to an activation system, to a vehicle, to a method and to a program.

BACKGROUND

Cruise Control (CC) systems for motor vehicles, when manually activated, automatically maintain the motor vehicle at a selected driving speed, referred to as a "Set Speed" or "vehicle cruise speed".

Adaptive Cruise Control (ACC) systems for motor vehicles, when manually activated, also maintain the motor vehicle, referred to herein as a "host vehicle", at a selected Set Speed and maintain the host vehicle at a selected "vehicle cruise headway" when a preceding (target) vehicle is disposed in the path of the host vehicle.

Semi-Autonomous and Autonomous Control systems for motor vehicles, when manually activated, may keep the lane position of the vehicle on a road. Such systems may additionally permit a "set-speed" to be selected by the driver of the vehicle (as in cruise control) and/or may additionally permit a "headway" to be selected by the driver of the vehicle as in ACC systems. Such systems may also comprise a queue assist or traffic jam assist feature which enables the host vehicle to follow a target vehicle at slow speeds and at short distances.

The present invention seeks to provide an improvement in the field of semi-autonomous and autonomous control systems for motor vehicles. Embodiments of the invention may provide an activation system suitable for semi-autonomous and autonomous control systems for motor vehicles, which is quick and simple for the driver of the vehicle to invoke and which avoids the need for the driver to press control buttons.

SUMMARY OF THE INVENTION

Aspects of the invention provide an activation system, a method, a program, and a vehicle as claimed in the appended claims.

According to an aspect of the invention for which protection is sought, there is provided an activation system for a vehicle comprising a driver operable steering device and a semi-autonomous or an autonomous control system, the activation system comprising:
  (i) at least one imaging means having a field of view encompassing at least a substantial portion of a driver operable steering device of a vehicle and being configured and/or arranged to collect, in use, a first image data set representing a raw image of a subject within said field of view; and
  (ii) a control module being configured and/or arranged to process said first image data for making a determination as to whether a driver is currently operating said driver operable steering device or not,
wherein, in response to making said determination, the activation system is configured and/or arranged to trigger a semi-autonomous or an autonomous control system.

Optionally, said determination as to whether a driver is currently operating said driver operable steering device or not is made by determining whether both of the driver's hands are off the steering device or whether both of the driver's hands are not off the steering device.

Optionally, the at least one imaging means comprises a camera selected from the group comprising: a thermal camera, a near infra-red camera, a stereo camera, a time of flight camera, a monochrome camera and an RGB camera.

Optionally, the at least one imaging means is positioned: in a portion of the interior roof of the vehicle in a region above a driver's seat; in a portion of the interior roof; within a housing for interior lights; incorporated into a rear-view mirror and/or in a B-pillar of the vehicle.

Optionally, the driver operable steering device is a steering wheel.

Optionally, the control module comprises one or more processors having at least one memory associated therewith and having at least one algorithm executable thereon configured to:
  (i) receive the first image data set;
  (ii) compare the first image data set with a background image data set stored in said at least one memory;
  (iii) create a first modified data set in dependence upon said first image data set and in dependence upon said background image data set;
  (iv) create a second modified data set in dependence upon a brightness characteristic associated with data elements of the first modified data set; and
  (v) create a third modified data set by identifying and blending incongruous elements within the second modified data set.

Optionally, said background image data set characterises a background image collected when no driver (and no hands) is present within the field of view and wherein said background image data set comprises a sequence of data elements each representing a pixel of the background image.

Optionally, said first image data set comprises a sequence of data elements each representing a pixel of said raw image of the subject within said field of view; and wherein said background image data set and said first image data set comprise the same number of data elements.

Optionally, said first modified data set is created by comparing data elements of said first image data set with (spatially) corresponding data elements of said background image data set and characterising matching data elements by a dark and/or black coloured data element in said second image data set; and by characterising different data elements by a white coloured and/or bright data element.

Optionally, data elements of the first modified data set are categorised as being above or below a brightness threshold in creating a second modified data set.

Optionally, a density of data elements representing dark pixels within a group of data elements of the second modified data set is computed and in dependence upon said density, incongruous data elements within the second modified data set are converted to dark data elements in the third modified data set (or vice versa).

Optionally, one or a spatially connected group of data elements within the second modified data set representing dark pixels, spatially surrounded by data elements representing white pixels, are converted to white data elements in the third modified data set.

Optionally, upon determining that the third modified data set comprises data elements relating to two significantly sized white coloured and/or bright areas, a positive determination is made that a driver's hands are on the driver operable steering device.

Optionally, a pose recognition algorithm is performed on said two significantly sized white coloured and/or bright areas, before making a positive determination is made that a driver's hands are on the driver operable steering device.

According to another aspect of the invention for which protection is sought, there is provided a vehicle comprising the activation system according to any relevant preceding paragraph.

Optionally, the activation system comprises an autonomous or semi-autonomous control system configured and/or arranged to control at least one selected from the group comprising: vehicle steering, vehicle speed, headway, following distance, acceleration, deceleration, and spatial positioning with respect to other vehicles, in response to activation of the autonomous or semi-autonomous steering control system.

According to further aspect of the invention for which protection is sought, there is provided a method of recognising whether hands are present within an image, the method comprising:
(i) receiving a first image data set representing said image;
(ii) comparing a first image data set with a background image data set;
(iii) creating a first modified data set in dependence upon said first image data set and in dependence upon said background image data set;
(iv) creating a second modified data set in dependence upon a brightness characteristic associated with data elements of the first modified data set;
(v) creating a third modified data set by identifying and blending incongruous elements within the second modified data set; and
(vi) identifying data elements within the third modified dataset, in dependence upon a brightness characteristic associated therewith, relating to two significantly sized areas.

In the absence of data elements within the third modified dataset relating to two significantly sized areas, the method may comprise making a determination that said hands are off a steering device present within the image.

In the presence of data elements within the third modified dataset relating to two significantly sized areas, the method may comprise making a determination that said hands are on a steering device present within the image.

Alternatively, or in addition, the method according to the foregoing aspect may comprise determining whether said hands are on or off a steering device present within the image in dependence upon at least one of the relative pose and position of the two significantly sized areas within the third modified dataset. Optionally, said determination may be made in further dependence upon one or more of the first image dataset, the background image dataset, the first modified data set and the second modified dataset.

According to yet a further aspect of the invention for which protection is sought, there is provided a program for a computer configured and/or arranged to perform the method according to the preceding paragraph when executed on a computer.

According to yet an even further aspect of the invention for which protection is sought, there is provided a method, for use by a driver of a vehicle, of activating and deactivating an autonomous or semi-autonomous steering control system provided in the vehicle, the method comprising, (the driver) deliberately moving both hands off the steering device in order to activate the autonomous or semi-autonomous steering control system; and (the driver) deliberately moving one or both hands onto the steering device in order to de-activate the autonomous or semi-autonomous steering control system.

The activation system comprises an imaging means which collects image data in the region of the steering wheel of the vehicle. Analysis of the collected image data is conducted in order to determine the position of the driver's hands relative to the steering wheel, and more specifically, but not exclusively, to determine whether both of the driver's hands are off the steering wheel or whether both of the driver's hands are not off the steering wheel. Upon a determination being made that both of the driver's hands are off the steering wheel, the activation system automatically triggers a semi-autonomous or autonomous control system to control steering (and optionally other functions such as vehicle speed and headway, without further input (manual activation) from the driver. Conversely, the activation system may be used by the driver to deactivate a semi-autonomous or autonomous control system.

Upon a determination being made that both of the driver's hands are not off the steering wheel (i.e. at least one of the driver's hands is on the steering wheel), a semi-autonomous or autonomous control system is deactivated and control of the vehicle returns to a "manual mode".

The activation system may be utilised in applications other than for vehicles.

As used herein the terms "semi-autonomous systems" and "autonomous systems" are used to refer to control systems for vehicles and for motor vehicles in particular, that (automatically) manage steering of the vehicle (motor vehicle). Such systems may issue command signals to an electrical power assisted steering (EPAS) system of a vehicle or in alternative arrangements, the autonomous and semi-autonomous systems may otherwise be associated with a steering mechanism of the vehicle such that the autonomous and semi-autonomous systems can make adjustments to the steering direction of the vehicle. Optionally, the terms "semi-autonomous systems" and "autonomous systems" are used to refer to systems that modify, manage or otherwise control a position of a vehicle relative to one or more features that are provided upon a surface on which the vehicle is travelling, for example white lines on a road denoting the boundaries of a "lane".

As used herein the term "manual mode" is used to refer to a mode in which a driver has at least one hand on the steering wheel and therefore does not have both hands off the steering wheel. In manual mode, a semi-autonomous system or an autonomous system is not in control of the steering and is in a deactivated state.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION OF EMBODIMENTS

Detailed descriptions of specific embodiments of the activation systems, systems, methods, programs and vehicles of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the activation systems, systems, methods, programs and vehicles described herein may be embodied in various and alternative forms. The figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
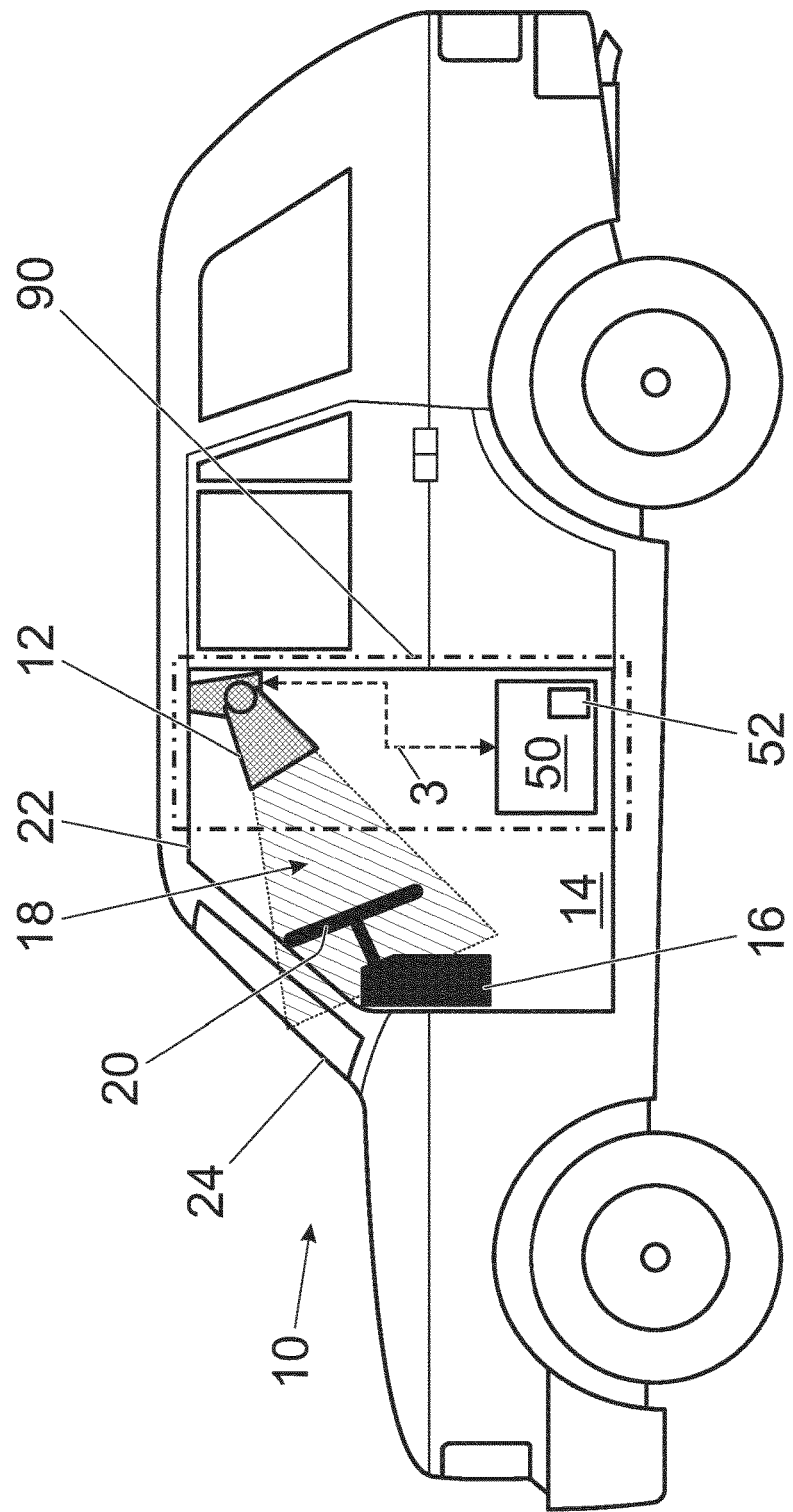
FIG. 1 is a schematic illustration of a vehicle comprising an activation system according to an embodiment of the invention.

In FIG. 1, there is shown a vehicle 10 comprising an activation system 90 for automatically triggering a semi-autonomous or an autonomous steering control system (not shown) of the vehicle 10. The autonomous or semi-autonomous control system may optionally be a steering control system or another control system configured and/or arranged to control at least one of the following vehicle controllable parameters: vehicle steering (for example keeping a vehicle in a lance defined by white lines), vehicle speed (for example adopting or maintain a vehicle or system selected cruise control speed), headway (for example maintaining a user selected or system selected time gap between the controlled vehicle and an immediately preceding vehicle in its path), following distance (for example maintaining a gap in meters between the controlled vehicle and an immediately preceding vehicle in its path), acceleration, deceleration, and spatial positioning with respect to other vehicles, in response to its activation by the activation system 90.

The activation system 90 is configured and/or arranged to continually monitor and assess whether a driver (not shown in FIG. 1) of the vehicle 10 is manually controlling steering of the vehicle 10. The activation system 90 makes a determination as to whether a driver of the vehicle 10 is operating a steering device 20 of the vehicle (or not); and in response thereto (and optionally in conjunction with assessment of one or more other vehicle parameters) the activation system 90 outputs a command signal to trigger automatic activation (or deactivation) of the semi-autonomous or an autonomous steering control system of the vehicle 10.

The activation system 90 in the embodiment illustrated in FIG. 1 comprises at least one imaging means 12 coupled to a control module 50. The at least one imaging means 12 in the present embodiment comprises a single near infra-red (NIR) camera 12. The at least one imaging means 12 is optionally mounted to or incorporated within the roof 22 of the vehicle 10 and is entirely disposed internally of the vehicle 10. A wiring harness (not shown) may couple the at least one imaging means 12 to the control module 50 and optionally to an additional power source (not shown).

The vehicle 10 shown in FIG. 1 is illustrated with a front passenger door and other internal features (such as seats) removed for ease of showing the activation system 90. The vehicle 10 comprises a driver operable steering device 20, which in this illustrated embodiment takes the form of a steering wheel 20. The steering wheel 20 is mounted to an internal structure 16 and is disposed within the cabin 14 of the vehicle 10 in reach of a driver (not shown) that would sit in the driver's seat (not shown).

It will be appreciated that the present embodiment is described and illustrated in the context of a vehicle 10 having right-hand drive. In other embodiments other relative and absolute positions of the components of the activation system 90 and of the driver operable steering device 20 are envisaged, for application, in for example, a left-hand drive vehicle, a vehicle having a centrally disposed steering wheel or a vehicle having a single seat for the driver.

It can be seen in FIG. 1 that in the present arrangement, the at least one imaging means 12 is incorporated into the vehicle 10 such that a field of view (FOV) 18 of the at least one imaging means 12 encompasses at least a substantial portion, if not all, of the driver operable steering device 20. The field of view 18 is thereby positioned and arranged to acquire image data of the steering device 20 and when present, of the driver's hands.

The field of view 18 of the at least one imaging means 12 may additionally encompass other parts of the vehicle 10, for example parts of the internal structure 16 and part of a front windscreen 24 and objects within view therethrough. Collectively these objects are referred to herein as the "subject". When the activation system 90 is in use and a driver of the vehicle 10 is positioned within reach of the steering device 20 for operating the steering device 20, the field of view 18 of the at least one imaging means 12 may additionally encompass parts of the driver. For ease of illustration of the activation system 90, in FIG. 1 a driver is not illustrated. The at least one imaging means 12 images a subject within the FOV 18 (see FIG. 2) and generates a first image data set which comprises a sequence of data elements.

Figure 2:
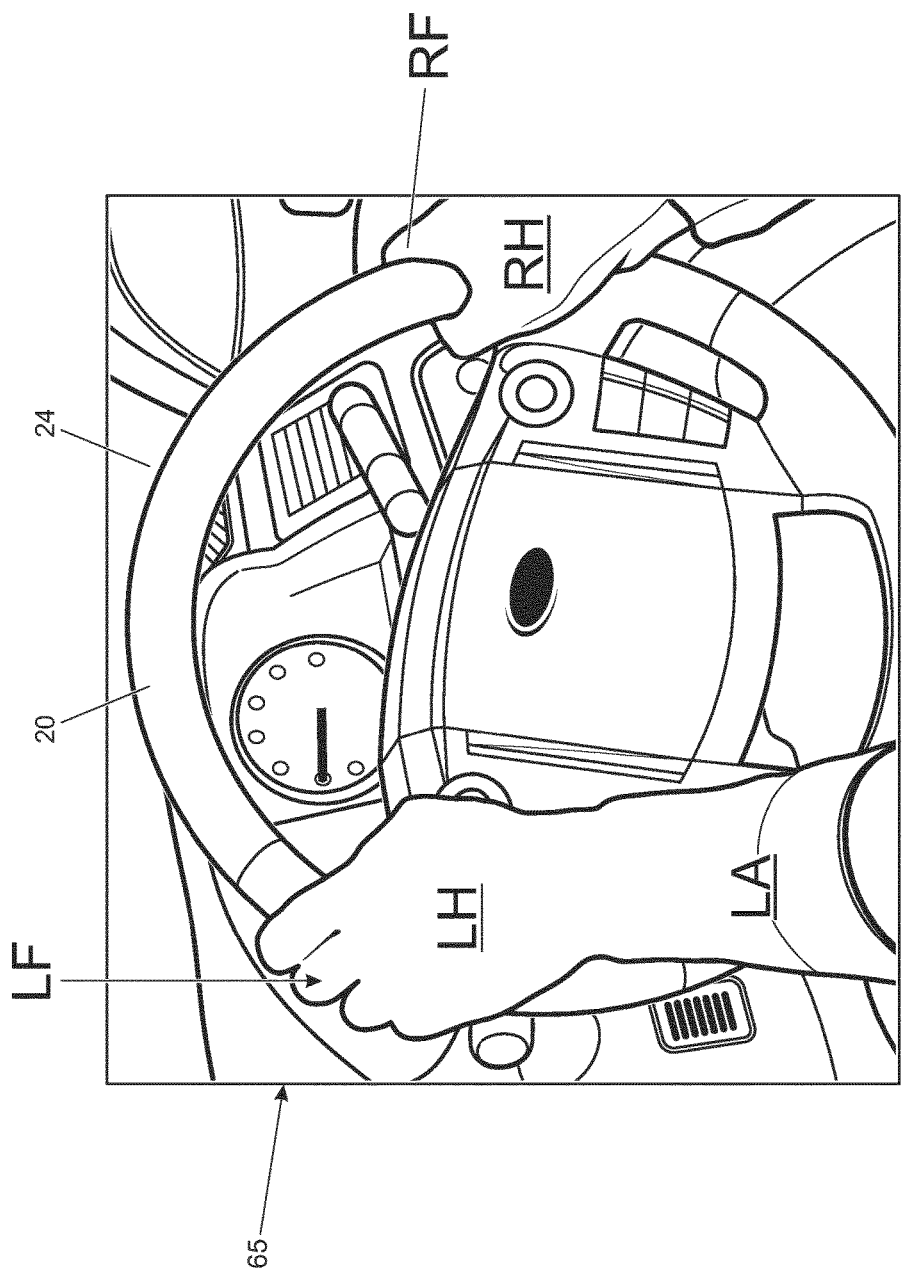
FIG. 2 is a pictorial representation of a first image data set obtained by an at least one imaging means of the activation system of FIG. 1.

In the present embodiment, the at least one imaging means 12 collects a first image data set 33 that represents a two-dimensional digital image 65 of the subject within the FOV 18. This digital image 65, is also referred to as a "raw image" 65 of the subject within the FOV 18 and is shown in FIG. 2. The subject of the raw image 65 includes a substantial part of the steering device 20, part of the front windscreen 24, part of the internal structure 16, and parts of a driver. Particularly, the parts of the driver that are contained in the illustrative raw image 65 of FIG. 2 include: part of the driver's left arm 'LA', part of the driver's left-hand 'LH', parts of the fingers 'LF' of the driver's left-hand 'LH', part of the driver's right-hand 'RH' and parts of the fingers 'RF' of the driver's right-hand 'RH'. All of the driver's left and right hands 'LH', 'RH', including the four fingers and thumb of each hand cannot be seen in the raw image 65 of FIG. 2 because the driver's hands are gripping the steering wheel 20 on either side thereof. The pose adopted by the driver in a normal driving position, as shown in the raw image 65, may be referred to as a "gripping pose".

The activation system 90 repeatedly and optionally continuously updates the first image data set 33 and in this way repeatedly and optionally continually monitors the steering wheel 20 and the position of a driver's hands relative thereto. The first image data set 33 representing the "raw image" 65 is communicated (repeatedly and optionally continually) to the control module 50, optionally by means of a connection 3. It will be appreciated that the connection 3 may be a data network connection; may be wired or wireless; and is suitable for transmitting electrical data signals. All data communications referred to herein may optionally take place using a vehicle CAN (Controller Area Network), LIN (Local Interconnect Network), directly between a component and a controller, or by any other suitable means which may comprise connections that are wired or wireless or a combination thereof.

The first image data set 33 is optionally a digital data set (or stream), which optionally comprises a sequence of data elements organized into rows, which represent pixels of the raw image(s) 65 of the subject imaged by the at least one imaging means 12.

The control module 50 optionally incorporates or is suitably associated with an image processing engine 52. The image processing engine 52 may comprise one or more processors having at least one memory associated therewith and having at least one algorithm 80 executable thereon for performing processing of the first image data set 33.

Figure 3:
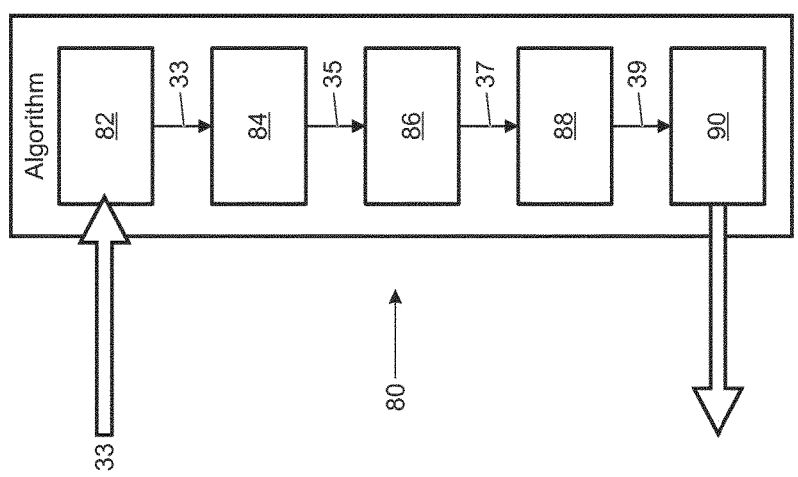
FIG. 3 is a schematic illustration of a first algorithm carried out by a control module of the activation system of FIG. 1 which outputs a determination as to whether a driver of the vehicle is operating a steering device of the vehicle (or not)

An exemplary, non-limiting embodiment of an algorithm 80 performed by the image processing engine 52 is illustrated in FIG. 3. The first image data set 33 transmitted by communications link 3 is input into the algorithm 80.

In a first step 82 of the algorithm 80, the first image data set 33 representing the raw image 65 is received by the control module 50 and, at least temporarily, stored for use by the image processing engine 52.

In a second step 84, the first image data set 33 is then manipulated in order to effectively "extract", a background image from the raw image 65 and to create a first modified data set 35. The background image data set characterises a background image that is collected when no driver is present within the field of view 18. The background image data set comprises a sequence of data elements each representing a pixel of a background image.

The first modified data set 35 is created by comparing data elements of the first image data set 33 with corresponding data elements of the background image data set and characterising matching data elements by data element in the first modified data set 35 that represents a dark and/or black coloured pixel. Data elements of the first image data set 33 that have a different characteristic to corresponding data elements in the background data set are represented in the first modified data set 35 by a data element that represents a bright and/or white coloured pixel.

Figure 4:
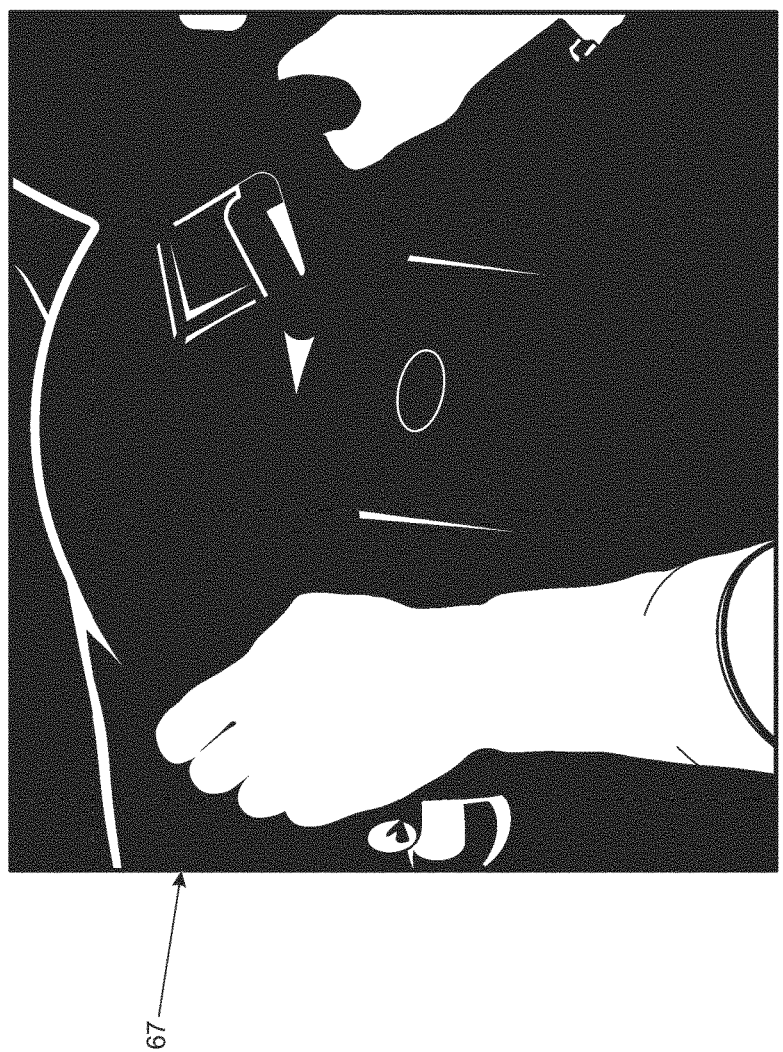
FIG. 4 is a pictorial representation of a first modified data set obtained by manipulating the first image data set (pictorially represented in FIG. 2), using the algorithm schematically represented in FIG. 3.

In this way, pixels in the raw image 65 that are the same as corresponding pixels in the background image are represented by dark and/or black pixels in a digital image 67 based upon the first modified data set; and pixels in the raw image 65 that have a different characteristic compared to corresponding pixels in the background image are represented by bright and/or white pixels in the digital image 67. A black and white digital image 67 represented by the first modified data set 35 is shown pictorially in FIG. 4.

The image processing engine 52 does not, itself, output images of the FOV 18 or digital images 65, 67, based upon the first image data set 33 or first modified data set 35 (and neither does the activation system 90). However, the digital images 65, 67, 69, 71 that are represented by the first image data set 33, first modified data set 35, a second modified data set 37 and a third modified data set 39 created by the at least on imaging means 12 and image processing engine 52 respectively are shown in FIGS. 2 and 4 to 6. This is in order to illustrate the present embodiment of the invention to the reader and to show how the image processing engine 52 processes and analyses the first image data set 33.

In the present embodiment, the at least one imaging means 12 is utilised to collect a background image data set by directing the field of view 18 of the at least one imaging means 12 towards the steering device 20, just as it would be in normal use, albeit when the driver is not present. The features contained in a background image are typically static. For example, the internal structure 16, the outline shape, general position and size of the steering device 20 and the relative position and size of the front windscreen 24 do not tend to move over time (albeit some adjustment of the position of the steering device 20 may be provided for—see below). The fact that the background image can be consistently replicated is advantageously utilised by the algorithm 80 of the present disclosure in determining whether or not the driver has two hands on the steering device 20 and is presently steering the vehicle 10 using the steering device 20 in a manual mode. Since the raw image data and the background data are both collected by the same, or similar imaging means 12, located in the same (or very similar) location (i.e., optionally mounted within the roof 22), the resolution (number of data elements) of the first image data set 33 and the background data set used to characterise the background image is the same. Subject to conducting other data processing manipulations (for example, uncompressing the transmitted first image data set), "extraction" of the background data set therefrom can be conducted relatively quickly.

The background image data set may be stored in a memory associated with the image processing engine 52 and may be referenced each time the algorithm 80 is repeated and a new and current first image data set 33 is processed. Various data processing techniques are suitable for extracting a calibrateable background data set from the first image data set 33.

In an optional third step 86 of the algorithm 80, the first modified data set 35 is subjected to "segmentation" and then a second modified data set 37 is created. In the segmentation step data elements in the first modified data set are categorised or manipulated in dependence upon a brightness characteristic associated therewith. Optionally, one or more brightness thresholds may be used. In the present arrangement, a single brightness threshold is used and data elements having a brightness characteristic below this threshold have their brightness level lowered even further; and optionally, data elements having a brightness characteristic above this threshold have their brightness level increased. Alternatively two thresholds may be used, wherein data elements having a brightness characteristic below a first threshold have their brightness level lowered; data elements having a brightness characteristic above second threshold have their brightness level increased; and data elements having a brightness characteristic between the first and second thresholds may be unchanged. Preferably, a single threshold is used in order to provide a greater differentiation between dark and light areas.

Figure 5:
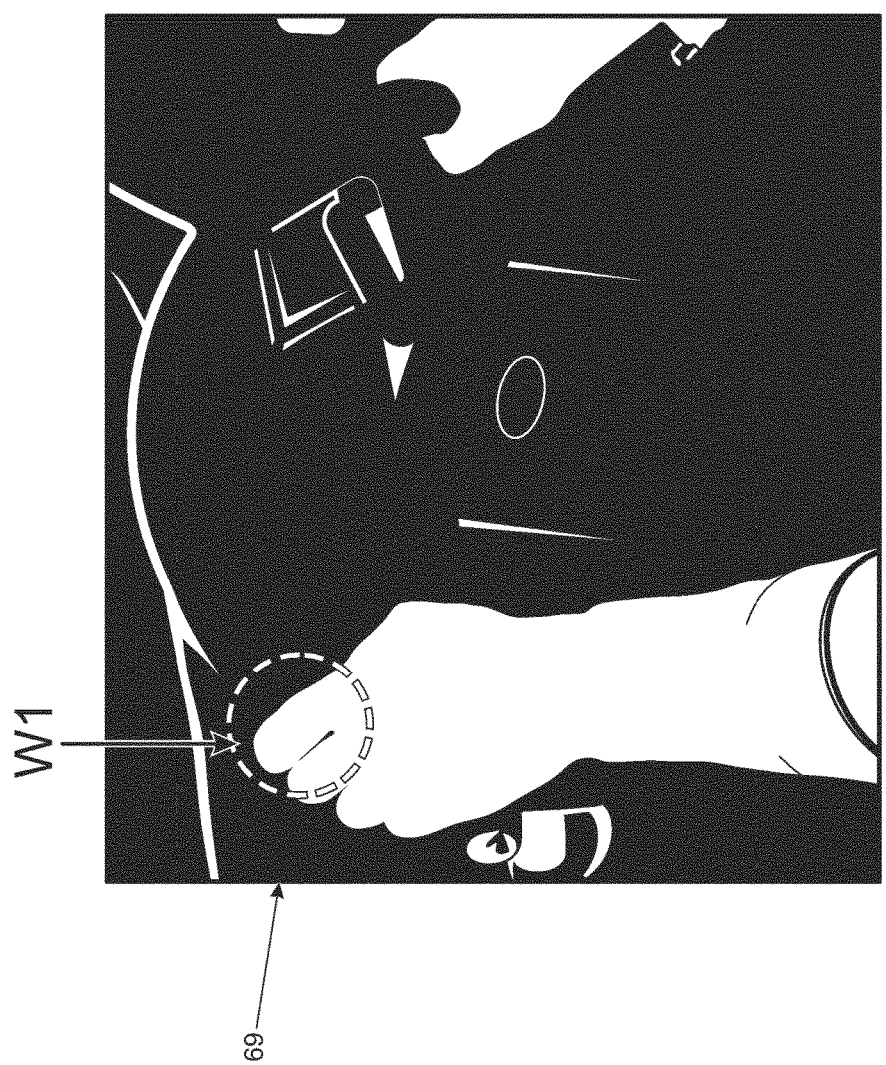
FIG. 5 is a pictorial representation of a second modified data set obtained by manipulating the first modified data set pictorially represented in FIG. 4, using the algorithm schematically represented in FIG. 3.
Figure 6:
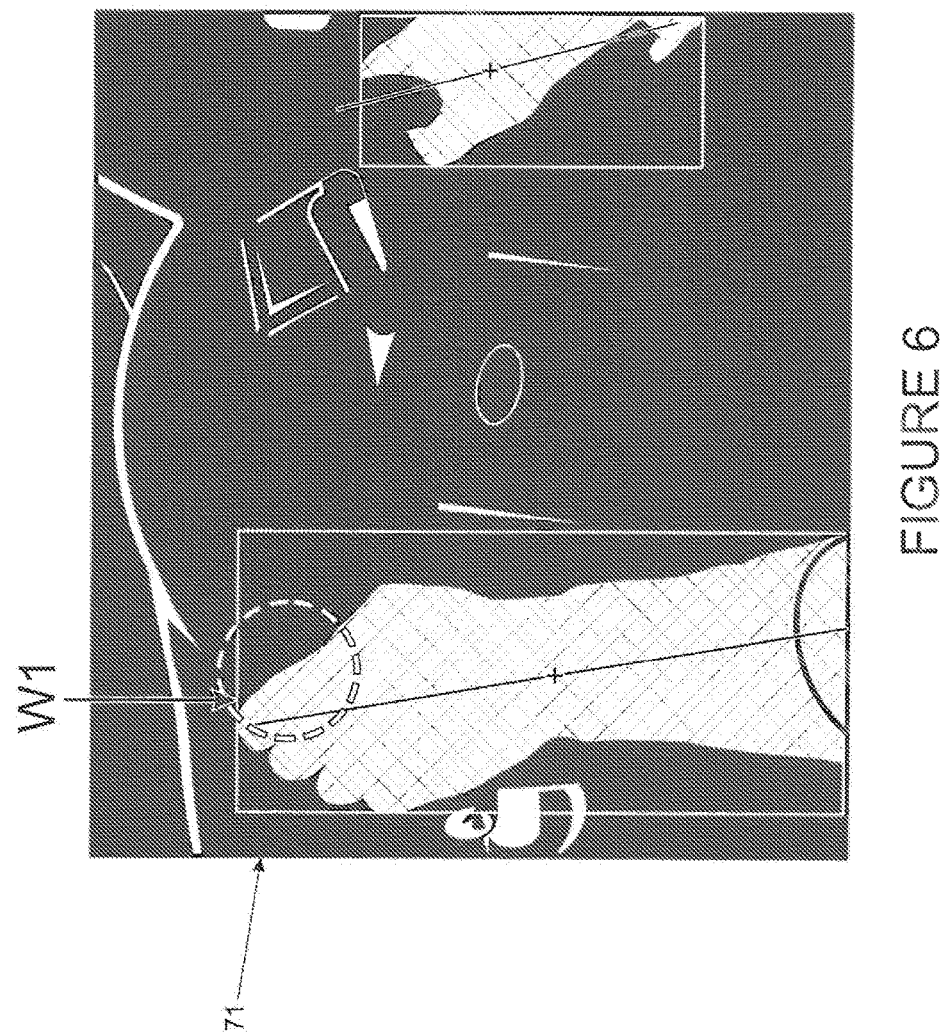
FIG. 6 is a pictorial representation of a third modified data set obtained by manipulating the second modified data set pictorially represented in FIG. 5, using the algorithm schematically represented in FIG. 3.

This is beneficial because skin may reflect the near infra-red radiation emitted by the NIR camera 12 and this step may be useful in the automated recognition of the position of the driver's left-hand and right-hand, by highlighting two brighter and/or whiter areas or shapes. In FIG. 5 a pictorial representation 69 of the second modified data set 37 is shown.

In an optional fourth step 88 of the algorithm 80, the second modified data set 37 is subjected to "connected component labelling" and a third modified data set 39 is created and output. In the fourth step 88, further enhancement, to make the driver's hands and/or arms more identifiable (if they are present), is conducted by blending incongruous pixels of a digital image 69, represented by data elements in the second modified data set 37, with the pixels around them.

For example, consider the digital image 69 shown in FIG. 5. Pixels within the digital image 69 that are relatively isolated and/or that are relatively different to the pixels around them are modified so that they are more similar to the pixels surrounding them. In FIG. 5, a region denoted by W1 comprises a significant density of dark and black colour pixels with a very low density of white pixels. The algorithm 80 at the fourth step 88 is configured and/or arranged to mathematically identify the data elements within the second modified data set 37 that represent isolated dark and black pixels within the dense region of white pixels; and change or modify those data elements or otherwise create corresponding data elements in a third modified data set 39, in which data elements corresponding to the incongruous pixels represent or more closely match the greater population of white pixels around them. The third data set 39 is pictorially illustrated 71 in FIG. 6, wherein the same region 'W1' is highlighted. It can be seen that many of the dark pixels from the digital image 69 (represented by the second modified data set 37), have been changed to white pixels. Any remaining white pixels are in groups of white pixels.

The step of "connected component labelling" may be carried out by (mathematically) "joining" or blending together one or more white areas that are close to one another and that are separated by a relatively small black area. Similarly, the step of "connected component labelling" may be carried out by (mathematically) "joining" or blending together one or more black areas that are close to one another and that are separated by a relatively small white area. In this embodiment, if a black area is surrounded by larger white areas, then it is changed to white. The third modified data set 39 thereby produced is further enhances the presence, shape and position of a driver's hands relative to a steering device 20.

In a further step 90, the algorithm 80 is configured to determine whether two hands are identifiable within the FOV 18. In one embodiment this is achieved by (mathematically) determining that two relatively large and relatively light areas exist within the FOV 18. If two such areas are present (as in FIG. 6) then a determination may be made that the driver does not have two hands off the wheel—the driver is operating the steering device 20 and the vehicle 10 is in "manual mode".

In another embodiment, the relative position and/or pose of the "large bright and white areas" is further considered in order to determine with even more confidence whether the driver has two hands on the steering device and is operating the steering device 20. It is possible that two large bright and white areas could be identifiable within the processed and modified image of the FOV 18, but that in fact the driver is not gripping the steering wheel 20 and is not using the steering device 20. Optionally, this "pose estimation" step may incorporate the use of a pose-estimation algorithm in which, the shape of the large light areas is considered and analysed. Optionally, the identified shape may be compared to one or more reference shapes. The purpose of which may be to identify an (outline) shape in the expected region of the driver's fingers which indicates that the fingers are "gripping" or are "not gripping". It is expected that a driver deliberately triggering activation of semi-autonomous or autonomous driving mode by making use of the activation system 90 will make a clear and deliberate gesture to takes both his hands off the steering wheel.

In some embodiments, before a determination is made that the driver is no longer operating the steering device 20 (i.e. his hands are "off" the steering wheel 20), the control module 50 conducts further checking steps and considers one or more other vehicle parameters, which optionally may include: whether or not a driver seat safety belt is engaged; whether or not a pressure sensor associated with a driver's seat is issuing a signal indicative of a driver sitting in the driver's seat; and/or whether a driver facing camera system has determined, optionally based on an eye-openness level of the driver's eyes, whether the driver is awake and is deliberately performing the gesture of removing his hands off the steering device 20. In this way an automatic activation of an autonomous or semi-autonomous control system is only carried out if it is determined that the driver is present in the driver's seat and that both of the driver's hands are not within the FOV 18 and are not operating the steering device 20. In other words, an automatic activation of an autonomous or semi-autonomous control system is only carried out in response to the driver making a deliberate gesture. This provides a very simple mechanism by which a driver can deliberately invoke the autonomous or semi-autonomous control system of the vehicle 10. Rather than the driver having to press a button to select autonomous or semi-autonomous control of the vehicle 10, the present invention provides for a driver to simply remove both of his hands from the steering wheel 20 in order to stop a manual driving mode and invoke the autonomous or semi-autonomous driving mode.

Figure 7:
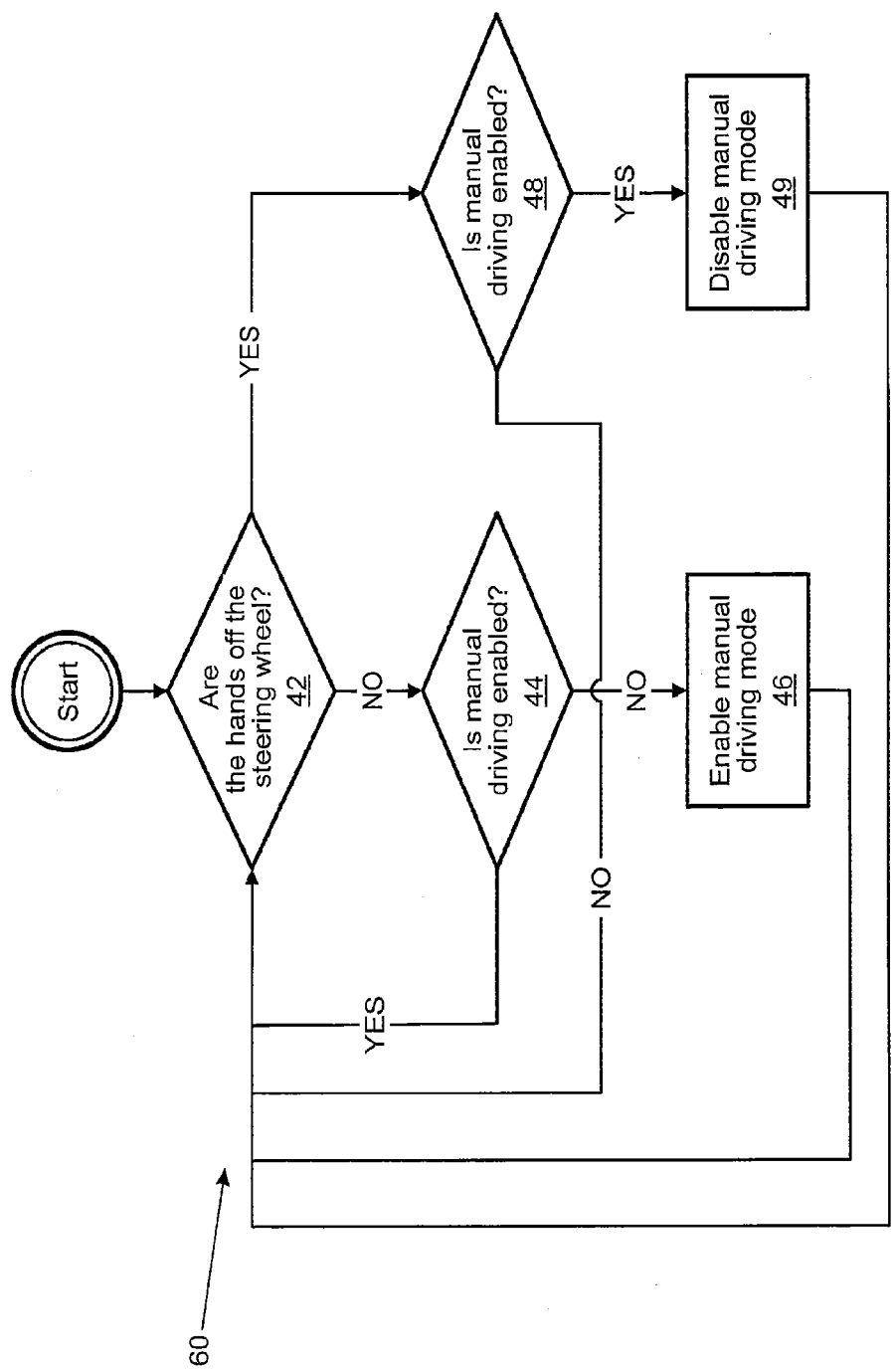
FIG. 7 is an illustration of decision algorithm carried out by the control module of the activation system of FIG. 1, provided for determining whether in response to the output of the algorithm in FIG. 3, a semi-autonomous or autonomous system of the vehicle (not shown) should be automatically activated.

In the present arrangement, upon the activation system 90 determining whether the driver's hands are "on" or "off" the steering wheel 20, a subsequent algorithm is carried out in order to determine whether automatic activation of an autonomous or semi-autonomous control system should be conducted. In FIG. 7 a decision algorithm 60 is illustrated schematically. The decision algorithm 60 is performed by the control module 50 of the activation system 90 and is provided for determining whether, in response to the output of the algorithm 80 (FIG. 3), a semi-autonomous or autonomous system of the vehicle 10 (not shown) should be automatically activated.

In dependence upon the manner in which the vehicle 10 and its various control systems are configured, a "manual mode" control signal may be available on a data network within the vehicle 10 (such as a Controller Area Network (CAN)). The "manual mode" control signal may be used by one or more systems of the vehicle 10 to determine, for example, whether they are active or not active or for example to determine how they should operate. As such in an embodiment of the invention, "activation" of a semi-autonomous or autonomous driving system may result as a direct consequence of the "manual mode" control signal indicating that manual mode driving is off.

Upon running the algorithm 60, a first step 42 asks:

Step 42: Both of the driver's hands are off the steering device 20. TRUE or FALSE? The "TRUE" or "FALSE" answer to this question is determined by the processing algorithm 80 which is performed by the image processing engine 52 and is provided as an input to algorithm 60.

If the answer at step 42 is "TRUE" (both of the driver's hands are off the steering device 20 and the driver is not operating the steering device 20), then step 44 (see below);

If the answer at step 42 is "FALSE" (at least one of the driver's hands are on the steering wheel) then step 48 (see below);

Step 44: Manual mode is on, "TRUE" or "FALSE"?

This step is provided to check that when the driver's hands are identified as being on the steering wheel 20 that a semi-autonomous or autonomous system is not active—i.e., that the vehicle 10 is responsive to the driver operating the steering wheel 20.

If the answer at step 44 is "TRUE" then return to step 42 to continue to monitor the driver's hands;

If the answer at step 44 is "FALSE" then go to step 46;

Step 46: Activate or enable manual driving mode and return to step 42 to continue to monitor the FOV 18 to monitor the position of the driver's hands relative to the steering wheel 20.

Step 48: Manual mode is on, "TRUE" or "FALSE"?

This step is provided to check whether a semi-autonomous or autonomous system is already active when the driver's hands are identified as being off the steering wheel 20.

If the answer at step is "FALSE" and a semi-autonomous or autonomous system is currently active, then return to step 42 to continue to monitor the driver's hands (in order that upon at least one of the driver's hands returning to the wheel 20, semi-autonomous or autonomous driving can be subsequently deactivated when appropriate to do so);

If the answer is "TRUE" then go to step 49;

Step 49: Activate or enable a semi-autonomous or autonomous system (in other words deactivate or disable "manual driving mode") and return to step 42 to continue to monitor the FOV 18 to monitor the position of the driver's hands relative to the steering wheel 20.

The algorithm 60 is repeated continuously and optionally at the same rate as first image data sets 33 are collected. The continual or frequent collection of image data, its processing and analysis using algorithm 80 and decision algorithm 60 provides for automatic activation and deactivation of the semi-autonomous or autonomous driving modes.

It can be appreciated that various changes may be made within the scope of the present invention, for example, in other embodiments of the invention it is envisaged that more than one imaging means is used, which are of the same or of different types to one another. In other embodiments the at least one imaging means 12 does not comprise an infrared camera 12. It is envisaged that other suitable imaging means can be used and that in other embodiments combinations of different types of imaging means may be utilised. As such, the at least one imaging means 12 may comprise one or more or a combination of imaging means selected from the group comprising: a stereo camera, a time-of-flight camera, a thermal camera, a Red Green Blue RGB (i.e., colour) camera, a monochrome camera, a stereo camera, and any other suitable cameras.

The at least one imaging means may be suitable in some embodiments for collecting 3-D (three-dimensional) images. The at least one imaging means may collect image data in an analogue or digital format. However before processing and analysis of the image data can be conducted any analogue signals would, preferably, be converted into digital data streams.

In some embodiments, the at least one imaging means is located in an alternative or additional position compared to the roof position illustrated. For example one or more additional or alternative imaging means may be positioned in the middle of the roof rather than on the driver's side; within housing for interior lights; incorporated into a rear-view mirror and/or in a B-pillar of the vehicle 10. Other locations may be utilised.

In some embodiments of the invention the operable steering device is not a steering "wheel" as such but is nevertheless a device operated by the driver in such a way that the activation system disclosed herein can monitor image data of the steering device and a driver's the presence and/or position of hands of a driver relative to the steering device in order to determine whether the driver is operating the steering device or not. In some arrangements, the operable steering device may be or comprise a joy-stick, lever steering device (for example a twin-lever device) and other steering devices that may come into use.

In some embodiments, the at least one imaging means 12 is configured to collect first image data representing a three-dimensional image of the subject.

In envisaged embodiments, two or more background image data sets may be stored in a memory associated with the control module (and/or image processing engine). The two or more background image data sets correspond to two or more background images acquired for different positions of the driver operable steering device 20. Where the driver operable steering device 20 is, for example, a steering wheel, it will be appreciated that the steering wheel 20 may have an adjustable height, adjustable angle of tilt and/or an adjustable extension distance (relative to internal structure 16). As such, two or more or a series of background images may be stored relating to different steering wheel positions. When processing of a first image data set is conducted and comparison made with a background image data set, a background image data set may be retrieved from a memory in dependence upon a steering wheel position reference relating to the position of the steering wheel at which the background image was acquired. For example, a position reference may be of the form: middle height, middle tilt position; or maximum height, middle tilt, fully extended position. In this way, the step of background image "extraction" is performed using a background image data set that more closely corresponds to the situation the steering wheel 20 is actually in.

Optionally, in some embodiments, the activation system 90 may receive a data signal indicative of a driver applied torque from a control module for an EPAS system. In dependence upon the existence and/or magnitude of the torque applied by the driver, the activation system 90 may determine that the driver does not have two hands off the steering device 20.

The following numbered paragraphs contain statements of invention:

1. An activation system for a vehicle comprising a driver operable steering device and a semi-autonomous or an autonomous control system, the activation system comprising:
   (i) at least one imager having a field of view encompassing at least a substantial portion of a driver operable steering device of a vehicle and being configured and/or arranged to collect, in use, a first image data set representing a raw image of a subject within said field of view; and
   (ii) a control module being configured and/or arranged to process said first image data for making a determination as to whether a driver is currently operating said driver operable steering device or not,
   wherein, in response to making said determination, the activation system is configured and/or arranged to trigger a semi-autonomous or an autonomous control system.
2. An activation system according to paragraph 1 wherein said determination as to whether a driver is currently operating said driver operable steering device or not is made by determining whether both of the driver's hands are off the steering device or whether both of the driver's hands are not off the steering device.
3. An activation system according to paragraph 2 wherein the at least one imager comprises a camera selected from the group comprising: a thermal camera, a near infra-red camera, a stereo camera, a time of flight camera, a monochrome camera and an RGB camera.
4. An activation system according to paragraph 1 wherein the at least one imager is positioned: in a portion of the interior roof of the vehicle in a region above a driver's seat; in a portion of the interior roof; within a housing for interior lights; incorporated into a rear-view mirror and/or in a B-pillar of the vehicle.
5. An activation system according to paragraph 1 wherein the driver operable steering device is a steering wheel.
6. An activation system according to paragraph 2 wherein the control module comprises one or more processors having at least one memory associated therewith and having at least one algorithm executable thereon configured to:
   (i) receive the first image data set;
   (ii) compare the first image data set with a background image data set stored in said at least one memory;
   (iii) create a first modified data set in dependence upon said first image data set in dependence upon said background image data set;
   (iv) create a second modified data set in dependence upon a brightness characteristic associated with data elements of the first modified data set; and
   (v) create a third modified data set by identifying and blending incongruous elements within the second modified data set.
7. An activation system according to paragraph 6 wherein said background image data set characterises a background image collected when no driver is present within the field of view and wherein said background image data set comprises a sequence of data elements each representing a pixel of the background image.
8. An activation system according to paragraph 7, wherein said first image data set comprises a sequence of data elements each representing a pixel of said raw image of the subject within said field of view; and wherein said background image data set and said first image data set comprise the same number of data elements.
9. An activation system according to paragraph 8, wherein said first modified data set is created by comparing data elements of said first image data set with corresponding data elements of said background image data set and characterising matching data elements by a dark and/or black coloured data element in said second image data set; and by characterising different data elements by a white coloured and/or bright data element.
10. An activation system according to paragraph 9, wherein data elements of the first modified data set are categorised as being above or below a brightness threshold in creating a second modified data set.
11. An activation system according to paragraph 10, wherein a density of data elements representing dark pixels within a group of data elements of the second modified data set is computed and in dependence upon said density, incongruous data elements within the second modified data set are converted to dark data elements in the third modified data set.
12. An activation system according to paragraph 11, wherein one or a spatially connected group of data elements within the second modified data set representing dark pixels, spatially surrounded by data elements representing white pixels, are converted to white data elements in the third modified data set.
13. An activation system according to paragraph 12, wherein upon determining that the third modified data set comprises data elements relating to two significantly sized white coloured and/or bright areas, a negative determination is made that a driver's hands are off the driver operable steering device, and/or wherein upon determining that the third modified data set dos not comprise data elements relating to two significantly sized white coloured and/or bright areas, a positive determination is made that a driver's hands are off the driver operable steering device.
14. An activation system according to paragraph 13, wherein a pose recognition algorithm is performed on said two significantly sized white coloured and/or bright areas, before making a positive determination that a driver's hands are off the driver operable steering device.

15. A vehicle comprising the activation system according to paragraph 1.

16. A vehicle according to paragraph 15 wherein activation system comprises an autonomous or semi-autonomous control system configured and/or arranged to control at least one selected from the group comprising: vehicle steering, vehicle speed, headway, following distance, acceleration, deceleration, and spatial positioning with respect to other vehicles, in response to activation of the autonomous or semi-autonomous steering control system.

17. A method of recognising whether hands are present within an image, the method comprising:
   (i) receiving a first image data set representing said image;
   (ii) comparing a first image data set with a background image data set;
   (iii) creating a first modified data set in dependence upon said first image data set and in dependence upon said background image data set;
   (iv) creating a second modified data set in dependence upon a brightness characteristic associated with data elements of the first modified data set; (v) creating a third modified data set by identifying and blending incongruous elements within the second modified data set; and
   (vi) identifying data elements within the third modified dataset, in dependence upon a brightness characteristic associated therewith, relating to two significantly sized areas.

18. A method according to paragraph 17 comprising:
   (vii) in the absence of data elements within the third modified dataset relating to two significantly sized areas, making a determination that said hands are off a steering device present within the image.

19. A method according to paragraph 17 comprising:
   (viii) in the presence of data elements within the third modified dataset relating to two significantly sized areas, making a determination that said hands are on a steering device present within the image.

20. A method according to claim 17 comprising:
   (ix) determining whether said hands are on or off a steering device present within the image in dependence upon at least one of the relative pose and position of the two significantly sized areas within the third modified dataset.

21. A method, for use by a driver of a vehicle, of activating and deactivating an autonomous or semi-autonomous control system provided in the vehicle, the method comprising, deliberately moving both hands off the steering device in order to activate the autonomous or semi-autonomous steering control system; and deliberately moving one or both hands onto the steering device in order to de-activate the autonomous or semi-autonomous steering control system.

22. A program for a computer configured and/or arranged to perform the method according to paragraph 17 when executed on a computer.

The invention claimed is:

1. An activation system for a vehicle semi-autonomous or autonomous steering control system, the activation system comprising:
   at least one imager having a field of view encompassing at least a portion of a driver operable steering device, wherein the at least one imager collects a first image data set representing a raw image within said field of view; and
   a control module comprising one or more processors configured to receive the first image data set and to process said first image data set to determine whether a driver is currently operating said driver operable steering device or not;
   wherein, in response to determining that the driver is not currently operating said driver operable steering device, the activation system activates the semi-autonomous or autonomous steering control system;
   wherein processing the first image data set comprises:
      comparing the first image data set with a background image data set;
      creating a first modified data set in dependence upon said first image data set and in dependence upon said background image data set;
      creating a second modified data set in dependence upon a brightness characteristic associated with data elements of the first modified data set;
      creating a third modified data set by identifying and blending incongruous pixels represented by data elements in the second modified data set with the pixels around them;
      determining whether turning whether the third modified data set comprises data elements relating to two areas corresponding to both hands of the driver within the field of view of the at least one imager; and
      identifying shapes of the two areas and comparing the identified shapes of the two areas to one or more reference shapes to identify a shape in an expected region of the driver's fingers indicating that the fingers are gripping the steering device or are not gripping the steering device.

2. The system of claim 1, wherein determining whether a driver is currently operating said driver operable steering device or not is made by determining whether both hands of the driver are off the steering device or whether both hands of the driver are on the steering device.

3. The system of claim 1, wherein the at least one imager comprises a thermal camera, a near infra-red camera, a stereo camera, a time of flight camera, a monochrome camera or an RGB camera.

4. The system of claim 1, wherein the at least one imager is located in one or more of a portion of an interior roof of the vehicle in a region above a driver's seat, a portion of the interior roof, a housing for interior lights, a rear-view mirror and/or in a B-pillar of the vehicle.

5. The system of claim 1, wherein the driver operable steering device comprises a steering wheel.

6. The system of claim 1, wherein said background image data set characterizes a background image collected when no driver is present within the field of view, and wherein said background image data set comprises a first sequence of data elements each representing a pixel of the background image.

7. The system of claim 6, wherein said first image data set comprises a second sequence of data elements each representing a pixel of said raw image of the subject within said field of view, and wherein said background image data set and said first image data set comprise a same number of data elements.

8. The system of claim 7, wherein said first modified data set is created by comparing data elements of said first image data set with corresponding data elements of said background image data set and characterizing matching data elements by a dark and/or black data element in said second image data set, and by characterizing different data elements by a white and/or bright data element.

9. The system of claim 1, wherein data elements of the first modified data set are categorized via the one or more processors as being above or below a brightness threshold in creating a second modified data set.

10. The system of claim 1, wherein upon determining that the third modified data set comprises data elements relating to two white and/or bright areas, a negative determination is made that a driver's hands are off the driver operable steering device, or wherein upon determining that the third modified data set does not comprise data elements relating to the two white and/or bright areas, a positive determination is made that a driver's hands are off the driver operable steering device.

11. A vehicle comprising the system of claim 1.

12. The vehicle of claim 11, wherein the autonomous or semi-autonomous steering control system controls vehicle steering.

13. The vehicle of claim 12, wherein the autonomous or semi-autonomous steering control system controls one or more of the following: vehicle speed, headway, following distance, acceleration, deceleration, and spatial positioning with respect to other vehicles, in response to activation thereof.

14. A method of activating a semi-autonomous or autonomous control system by recognizing whether a person's hands are present within an image, the method comprising:
    receiving a first image data set representing a raw image within a field of view encompassing at least a portion of a driver operable steering device; and
    processing said first image data set to determine whether a driver is currently operating the driver operable steering device or not;
    wherein, in response to determining that the driver is not currently operating said driver operable steering device, activating the semi-autonomous or autonomous steering control system;
    the processing of said first image data comprising:
        comparing the first image data set with a background image data set;
        creating a first modified data set in dependence upon said first image data set and in dependence upon said background image data set;
        creating a second modified data set in dependence upon a brightness characteristic associated with data elements of the first modified data set;
        creating a third modified data set by identifying and blending incongruous pixels represented by data elements in the second modified data set with the pixels around them;
        determining whether the third modified data set comprises data elements relating to two areas corresponding to both hands of the driver within the field of view; and
        identifying shapes of the two areas and comparing the identified shapes of the two areas to one or more reference shapes to identify a shape in an expected region of the driver's fingers indicating that the fingers are gripping the steering device or are not gripping the steering device.

15. The method of claim 14, further comprising:
in the absence of data elements within the third modified data set relating to two areas, determining that the person's hands are off the steering device present within the image; and
in the presence of data elements within the third modified data set relating to two areas, determining that the person's hands are on the steering device present within the image.

* * * * *

UNITED STATES PATENT AND TRADEMARK OFFICE
CERTIFICATE OF CORRECTION

PATENT NO. : 10,345,806 B2
APPLICATION NO. : 15/119021
DATED : July 9, 2019
INVENTOR(S) : Eduardo Dias Page 1 of 1

It is certified that error appears in the above-identified patent and that said Letters Patent is hereby corrected as shown below:

In the Claims

Column 16, Line 23, Claim 1:
Please correct "determining whether turning whether the third"
To read -- determining whether the third --

Signed and Sealed this
Twenty-second Day of October, 2019

Andrei Iancu
*Director of the United States Patent and Trademark Office*